No. 854,828. PATENTED MAY 28, 1907.
F. LATIMER.
CAR WHEEL.
APPLICATION FILED SEPT. 11, 1906.
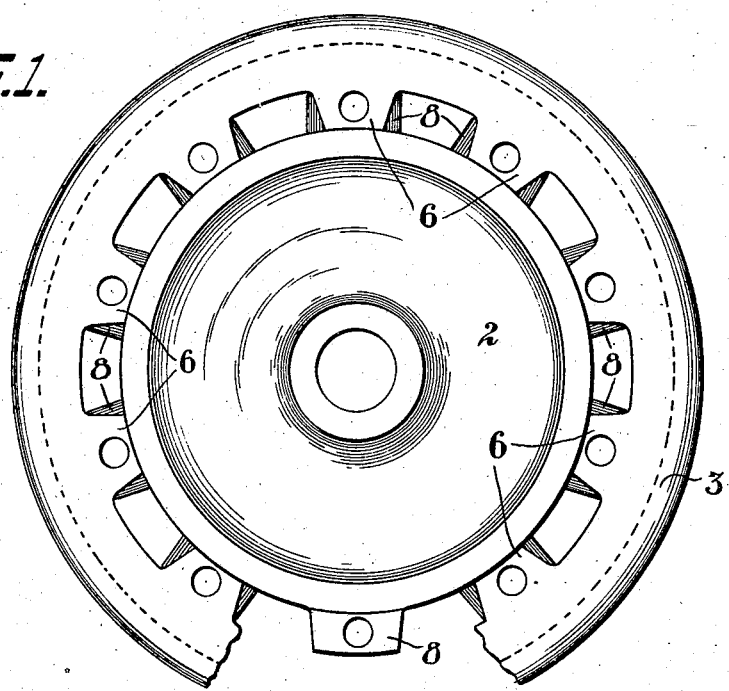
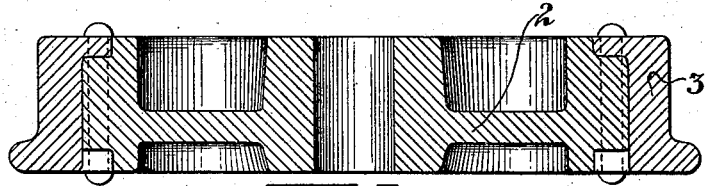
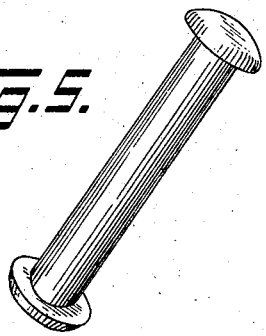
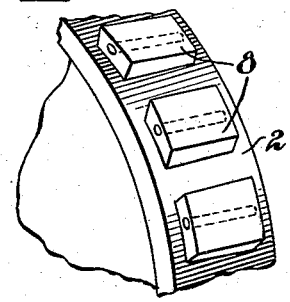
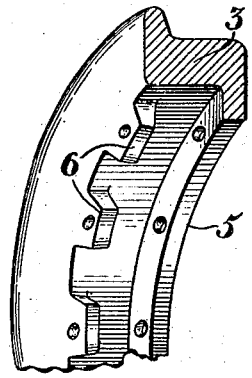
Witnesses:
Harry Fleischer.
W. D. Penney.
Inventor:
Frank Latimer.
By his Attorney,
F. H. Richards.

UNITED STATES PATENT OFFICE.

FRANK LATIMER, OF HIGH BRIDGE, NEW JERSEY, ASSIGNOR OF ONE-HALF TO TAYLOR IRON & STEEL COMPANY, OF HIGH BRIDGE, NEW JERSEY, A CORPORATION OF NEW JERSEY.

CAR-WHEEL.

No. 854,828.   Specification of Letters Patent.   Patented May 28, 1907.

Application filed September 11, 1906. Serial No. 334,086.

*To all whom it may concern:*

Be it known that I, FRANK LATIMER, a citizen of the United States, residing in High Bridge, in the county of Hunterdon and State of New Jersey, have invented certain new and useful Improvements in Car-Wheels, of which the following is a specification.

The present invention relates to car or locomotive wheels, the object being to provide an improved car wheel the center and tire of which are formed separately, but rigidly connected so that lateral play or movement of one part relative to the other, which is a source of great trouble in wheels of this character, is entirely obviated, the present invention being an improvement in part on that shown and described in my Patent No. 819,292, dated May 1, 1906.

A further object of the invention is the provision of an improved steel-tired wheel, the center of which, after wearing down of the tire, can be readily re-tired, and the tire of which is so secured to the center that should the tire in use split circumferentially the parts would still be secured to the center of the wheel in such a manner as to prevent accident, and in which, notwithstanding the formation of lugs or projections on one of the members, as for instance the center, intermediate its edges, the tire is so formed that it will have a firm support and bearing on both the edges of such center or body at the opposite sides of such center projections, as well as on such projections, the organization being such that there is little opportunity for any part thereof, should the tire become broken, to fly away from the center.

In the drawings accompanying and forming part of this specification, Figure 1 is a side view of this improved wheel, a part thereof being broken away to illustrate the mode of assembling the center and tire; Fig. 2 is a cross-sectional view thereof; Figs. 3 and 4 illustrate portions respectively of the center and tire; and Fig. 5 illustrates one of the bolts or rivets for connecting the members together.

Similar characters of reference indicate corresponding parts throughout the different figures of the drawings.

This improved wheel comprises a center or body 2, formed of any suitable material, and a tire 3, likewise formed of any suitable material, usually steel, and which tire may be an ordinary rolled steel one or otherwise formed as may be desired, and which center may have any of the various forms of construction which it may be desired to give to it, according to the service to which the wheel is to be put. That is to say, it may be of webbed formation, or ribbed formation, or spoked formation. The parts in practice will usually be assembled by heating the tire to a low heat and permitting it to cool and shrink on the center after it is assembled therewith in the manner hereinafter indicated.

For the purpose of connecting the tire and center together, one of the members, shown herein as the tire, is provided with an annular flange 5 adjacent to one side thereof, and on the opposite side with a series of projections or lugs 6. The periphery of the center or body is provided with a series of lugs or projections 8 of relatively large area, but so located relative to the center that there is formed at the ends of such projections what may be termed a rabbeted portion, the projections being so disposed that when assembled with the tire they will come between the inner surfaces of the projections or lugs of the tire and of the annular flange, and in alinement with the projections of such tire. Each of these projections of the center is of such width that it will fit between a pair of lugs or projections of the tire, so that the center may be inserted laterally into position with relation to the tire and then shifted circumferentially to bring the lugs of the tire and of the center into alinement, the lugs of the tire thus overlapping the ends of the projections of the center with the faces of the tire lugs and edge of the tire flange bearing firmly and closely upon the edges of the center at the ends of the center lugs, so that, notwithstanding portions of the center and tire are cut away to permit the assemblage of the tire and center in the manner indicated, thus leaving spaces between the alined lugs of the tire and center when the members are properly assembled, the tire has a firm bearing from side to side thereof at regular intervals around the wheel, and also at one side thereof, owing to the provision of the annular flange, entirely around the wheel.

For securing the two members together in the manner indicated, suitable bolts or rivets may be used, the latter being suitably headed after they are placed in position, a rivet passing through each pair of projections or lugs, one on the tire and one on the center, and through the annular flange.

I claim as my invention:

1. A car wheel comprising a center or body and a tire, one of said members having at one side along its edge a plurality of lugs or projections spaced apart and at its opposite edge an annular flange and the other of said members having a plurality of lugs or projections spaced apart and fitting between the lugs and flange of said first member, the lugs of one member passing between the lugs of the other when the members are assembled one laterally of the other and between the lugs and the flange of such other member and in alinement with its lugs when such members are shifted one circumferentially of the other, and means passing through each alined pair of lugs and flange for securing such members together and headed at both ends thereof.

2. A car wheel comprising a center or body and a tire, said tire having at its inner side along one edge a series of lugs or projections spaced apart and at the other edge an annular flange, and the center having on its periphery a series of lugs or projections spaced apart and fitting between the lugs and flange of the tire, the lugs of the center passing between the lugs of the tire whereby such tire and center are assembled one laterally of the other and between the tire lugs and flange and in alinement with its lugs when such tire and center are shifted one circumferentially of the other, and means passing through each alined pair of lugs and the flange for securing such tire and center together and headed at both ends thereof.

3. A car wheel comprising a center or body and a steel tire shrunk thereon, said tire having at its inner side along one edge a series of lugs or projections spaced apart and at the other edge an annular flange, and the center having on its periphery a series of lugs or projections spaced apart and of less width than the width of the tire and fitting snugly between the lugs and flange of the tire, the lugs of the center passing between the lugs of the tire whereby such tire and center are assembled one laterally of the other and between the tire lugs and flange and in alinement with its lugs when such tire and center are shifted one circumferentially of the other, and rivets passing through each alined pair of lugs and the flange for securing such tire and center together and headed at both ends thereof.

FRANK LATIMER.

Witnesses:
PERCIVAL CHRYSTIE,
BEN F. ROBBINS.